(12) United States Patent
Desnoyers

(10) Patent No.: US 8,933,781 B2
(45) Date of Patent: Jan. 13, 2015

(54) FINGERPRINT READER AND A METHOD OF OPERATING IT

(75) Inventor: Alexandre Desnoyers, Copenhagen O (DK)

(73) Assignee: Cardlab APS, Copenhagen K (DK)

( * ) Notice: Subject to any disclaimer, the term of this patent is extended or adjusted under 35 U.S.C. 154(b) by 926 days.

(21) Appl. No.: 12/736,914

(22) PCT Filed: May 20, 2009

(86) PCT No.: PCT/DK2009/000115
§ 371 (c)(1),
(2), (4) Date: Dec. 13, 2010

(87) PCT Pub. No.: WO2009/140968
PCT Pub. Date: Nov. 26, 2009

(65) Prior Publication Data
US 2011/0175702 A1    Jul. 21, 2011

Related U.S. Application Data

(60) Provisional application No. 61/071,875, filed on May 22, 2008.

(51) Int. Cl.
G05B 19/00 (2006.01)
G08B 1/08 (2006.01)
E05B 45/06 (2006.01)
(Continued)

(52) U.S. Cl.
CPC .......... *G06K 9/0002* (2013.01); *G06K 19/0718* (2013.01); *G06K 19/077* (2013.01); *G07C 2009/00095* (2013.01)

USPC ..... 340/5.82; 340/3.31; 340/5.1; 340/539.25; 340/542; 340/573.1

(58) Field of Classification Search
CPC ............ G06K 9/0002; G06K 19/0718; G06K 19/077; G07C 2009/00095
USPC ............ 340/3.31, 5.82, 5.1, 505, 5.3, 539.25, 340/542, 573.1; 705/44; 235/492, 380, 379, 235/451, 482; 713/184
See application file for complete search history.

(56) References Cited

U.S. PATENT DOCUMENTS 6,327,376 B1 * 12/2001 Harkin ........................ 382/124
6,848,617 B1 * 2/2005 Fries et al. .................... 235/492
(Continued)

FOREIGN PATENT DOCUMENTS

CN    1251650    4/2000
EP    0 789 334 A2    8/1997
(Continued)

*Primary Examiner* — Daniel Wu
*Assistant Examiner* — Mancil Littlejohn, Jr.
(74) *Attorney, Agent, or Firm* — Jacobson Holman PLLC

(57) ABSTRACT

A fingerprint reader comprising a fingerprint sensor adapted to output information relating to a fingerprint of a finger engaging a sensitive surface the sensor, and a stiff element comprising an indentation/cavity or through-hole, the sensor being positioned in the indentation/cavity/through-hole so that the sensitive surface is exposed to the surroundings. The stiff element will prevent breaking of the reader. Also, the stiff element may have one or more electrically conducting surface parts positioned adjacently to the sensitive surface of the sensor and being adapted to be contacted by a finger also contacting the sensor, so that the stiff element forms part of the reader.

13 Claims, 2 Drawing Sheets

(51) Int. Cl.
*G08B 23/00* (2006.01)
*G06K 9/00* (2006.01)
*G06K 19/07* (2006.01)
*G06K 19/077* (2006.01)
*G07C 9/00* (2006.01)

(56) References Cited

U.S. PATENT DOCUMENTS 7,090,139 B2 * 8/2006 Kasuga et al. ................ 235/494
7,278,025 B2 * 10/2007 Saito et al. .................... 713/185
7,409,876 B2 * 8/2008 Ganapathi et al. ....... 73/862.046
7,597,267 B2 * 10/2009 Miyazaki ..................... 235/492
2004/0129787 A1 7/2004 Saito et al.
2006/0072355 A1 4/2006 Ebihara et al.

FOREIGN PATENT DOCUMENTS

| WO | WO 99/41696 | 8/1999 |
| WO | WO 03/009223 A1 | 1/2003 |
| WO | WO 03/017211 A2 | 2/2003 |
| WO | WO 2005/124659 A1 | 12/2005 |

\* cited by examiner

FINGERPRINT READER AND A METHOD OF OPERATING IT

This is a national stage of PCT/DK09/000115 filed May 20, 2009 and published in English, claiming benefit of U.S. provisional application No. 61/071,875, filed May 22, 2008, hereby incorporated by reference.

FIELD OF THE INVENTION

The present invention relates to a fingerprint reader and in particular to a more rugged fingerprint reader which is useful in e.g. credit cards and other types of elements which are bendable to a certain degree.

BACKGROUND AND SUMMARY OF THE INVENTION

Fingerprint readers may be seen in e.g. WO99/41696 and WO2005/124659.

In general, fingerprint readers are based on a technology which is not bendable, which brings about a problem when provided in bendable elements.

In a first aspect, the invention relates to a fingerprint reader comprising:
 a fingerprint sensor adapted to output information relating to a fingerprint of a finger engaging a sensitive surface the sensor,
 a stiff element comprising an indentation/cavity or through-hole,
the sensor being positioned in the indentation/cavity/through-hole so that the sensitive surface is exposed to the surroundings.

In the present context, a fingerprint reader is to be interpreted broadly as an element adapted to determine information relating to a fingerprint of a finger.

A fingerprint sensor is an element adapted to sense at least part of a fingerprint, and normally does so using a sensitive or sensing surface. A fingerprint sensor may be adapted to determine the whole (relevant part) fingerprint in one measurement, meaning that it has a sensitive surface of a sufficient size for the relevant part of the finger to contact it at the same time, or it may be adapted to have the finger swiped over the sensor in order to sense parts of the fingerprint sequentially.

The information output of the sensor may be any type of information from which information may be derived about the fingerprint. This may be 2D information describing the positions/shapes of ridges or valleys of the fingerprint or more complex and/or more compressed data. This differs widely from sensor to sensor.

In the present context, a stiff element is an element providing/supporting the sensor with a sufficient stiffness to not bend too much when exposed to a predetermined force. Naturally, this feature will differ from application to application, depending on how rugged the sensor has to be, but for use in e.g. a credit card, a stiffness is preferred of 100 N/mm$^2$ or more, such as 150 N/mm$^2$, preferably 200 N/mm$^2$ or more, such as 250 N/mm$^2$, preferably 300 N/mm$^2$ or more, such as 350 N/mm$^2$, preferably 400 N/mm$^2$ or more.

In a preferred embodiment, the stiff element comprises a layer of a polymer, a metal, glass fibre/epoxy, such as a PCB, defining the overall stiffness of the stiff element and having a thickness of 0.2 mm or more, such as 0.4 mm or more, 0.5 mm or more, 1 mm or more.

Preferably, the indentation/cavity or through-hole has an extent along a main outer surface of the stiff element for the sensor to be positioned therein with the sensitive surface pointing away from the stiff element.

In a first embodiment:
 the stiff element comprises one or more first electrical conductors,
 the sensor comprises one or more second electrical conductors adapted to carry the output information, each of the second conductors being connected to a first conductor.

In this embodiment, the stiff element may be a PCB, where the first electrical conductors are formed in the conductive layers of the PCB.

In one embodiment, such as the first embodiment, the stiff element further comprises one or more electrically conducting surface parts positioned adjacently to the sensitive surface of the sensor and being adapted to be contacted by a finger also contacting the sensor. These conducting surface parts may alternatively or additionally be positioned adjacent to an outer rim of the indentation/cavity/through-hole.

In this context, "adjacently" will mean that the finger will contact both the electrically conductive surface part(s) and the sensitive surface part of the sensor at the same time. Thus, normally, the sensitive surface part and the electrically conductive surface part(s) will be no more than 5 mm, such as 3 mm, preferable no more than 2 or 1 mm from each other.

In that embodiment, it is preferred that the reader further comprises means for providing a signal to the conductive surface part(s) where the sensor is adapted to provide the output information on the basis of the signal provided to the surface part(s).

Preferably, the so-called Active Capacitive Measurement is used, wherein an RF signal is input into the finger via the conductive surface(s) and sensitive elements of the sensor will sense the signal, like antennas, as the signal strength depends on the capacitance/resistive connection, so from the distance between the skin and the pixel.

Also, positioning the sensor and conductive surface(s) in a fixed position in relation to each other will enhance the detection and structure of the set-up.

In that or another embodiment, the reader further comprises a processing element comprising identity information, the processing element being adapted to:
 receive the output information from the sensor,
 compare the received information to the identity information and
 determine a correspondence between the received information and the identity information.

In this context, "correspondence" will relate to the actual type of information. What is important is that, from the information, it may be determined whether the finger print detected/sensed corresponds to that, information relating to which has been stored.

Thus, identity of a person may be determined on the basis of the determined fingerprint information and predetermined identity information, which may be stored in or in connection with the sensor.

In this respect, the positive identification of the person or the corresponding of the information may bring about the running of an application which is only available upon positive identification. This application may relate to the transmission of data as a part of a money transaction or the opening of a door/access to an area. Any application today handled by smart cards or identification tokens may be started in this manner.

A particularly interesting aspect relates to a credit card size card comprising a fingerprint sensor according to the first aspect of the invention.

A credit card size card is a card having a longest dimension of 15 cm or less, and a thickness of 3 mm or less. In fact, a size as that of standard credit cards is preferred. One definition of this type of card is the so-called ID-1 size card.

Such credit cards must be bendable, as is stated in the ISO/IEC 10373-1 standard, the card, subjected to a test load, must have a deformation between 35 and 13 mm and must return to no more than 1.5 mm from its flat condition within one minute after the load is removed.

This required bendability brings about a problem for the sensor. Thus, it is preferred that the sensor is stiffened, or the surroundings of the sensor are stiffened by the stiff element. In addition, it is desired to retain an overall required stiffness/bendability of the card, so that the extent of the stiff element, along the longest side of a rectangular card, is no more than 25%, such as no more than 20%. Thus, the remainder of the card may be allowed to bend, while the surroundings of the sensor are more stiff.

In this aspect, it is preferred that the card further comprises a processing element adapted to receive the output information from the sensor, wherein the stiff element further comprises one or more electrically conducting surface parts each connected to the processing element. Thus, the signal from the sensor may be provided to the processing element via the stiff element, which may be a PCB to which the processing element may be connected to also provide this element with a certain stiffness and protect it from excessive bending.

A final aspect of the invention relates to a method of operating the fingerprint reader according to the first aspect or a card according to the particularly interesting aspect, the method comprising:

a finger engaging a sensitive surface of the sensor, the sensor outputting corresponding output information.

Thus, the sensor is supported or stiffened by the stiff element both during operation and during inactive periods where the user may handle the reader in a more casual manner.

In one embodiment, the stiff element comprises one or more first electrical conductors, the method comprising conducting the output information to the first electrical conductor(s). Thus, the stiff element is used not only for stiffening but also for transporting signals away from the sensor.

In that or another embodiment, the engaging step comprises the finger additionally contacting one or more electrically conducting surface parts of the stiff element positioned adjacently to the sensitive surface of the sensor. Then, and in particular when the outputting step comprises providing a signal to the conductive surface part(s) and providing the output information on the basis of the signal provided to the surface part(s), a better fingerprint reading may be obtained.

Positioning the sensor in relation to the stiff element and using also the surface of the stiff element will bring about a more simple set-up while facilitating a good relationship between the relative positions of the two elements.

In another embodiment, the method further comprises the steps of:

comparing the output information to predetermined identity information and determining a correspondence between the received information and the identity information.

Thus, the identity of a person or the allowability of the person to use the e.g. card for e.g. transactions, access or the like may be determined, and a processing element of the card or the like may subsequently be used for handing additional operations which are allowable/run/started only when the correct fingerprint has been entered.

Further scope of applicability of the present invention will become apparent from the detailed description given hereinafter. However, it should be understood that the detailed description and specific examples, while indicating preferred embdiments of the invention, are given by way of illustration only, since various changes and modifications within the spirt and scope of the invention will become apparent to those skilled in the art from this detailed description.

BRIEF DESCRIPTION OF THE DRAWING

In the following, preferred embodiments of the invention will be described with reference to the drawing, wherein.

DESCRIPTION OF THE PREFERRED EMBODIMENTS

Figure 1:
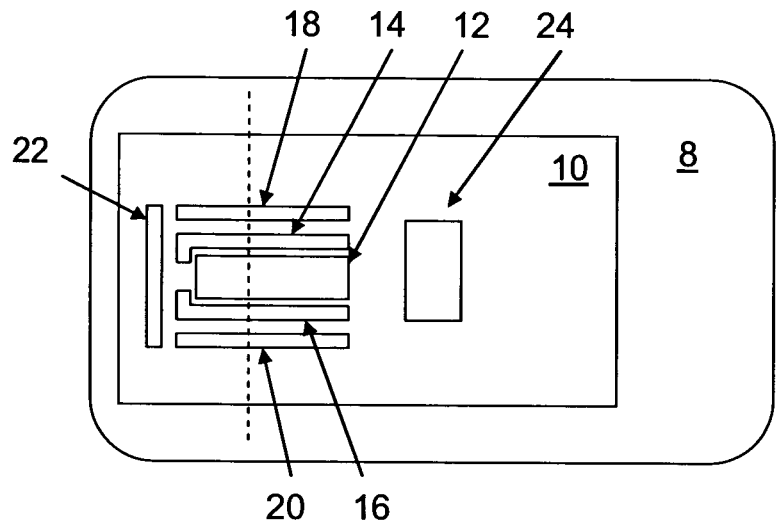
FIG. 1 illustrates a preferred embodiment seen from the top.

In FIG. 1, a preferred embodiment of a card or reader 8 having a sensor 12 positioned at or in a surface of a stiff element/PCB 10 in order for a finger to be swept over the sensor 12 thus outputting information relating to the fingerprint of the finger.

In the present embodiment, the sensor 12 is adapted to a sweeping motion of the finger (elongate structure). Alternatively, a larger-area sensor may be used which is adapted to sense the fingerprint with no motion of the finger.

The present sensor 12 is of the so-called active capacitive measurement type, which requires one or more electrodes 14 and 16 provided adjacent thereto in order for a signal to be provided into the finger while sweeping. This type of sensor may be seen in WO99/41696. This is described further below.

In addition, a processor 24 may be provided on the PCB 10 for receiving the information output of the sensor 12 and providing or controlling the signal(s) provided to the electrodes 14 and 16.

Communication/power transfer between the processor 24 and the surroundings, such as a card reader or the like, may be handled via electrodes 18, 20, 22, which are provided around the sensor 12. The positions of these electrodes, however, may be chosen freely. Naturally, such power transfer or communication may also, additionally or alternatively take place over the electrodes 14 and 16.

In order to provide the PCB 10 and the elements attached thereto in a card 8, it may be laminated much in the same manner as chips etc. are laminated in smart cards today.

Figure 2:
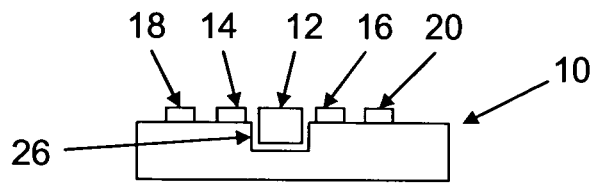
FIGS. 2 and 3 illustrate cross sections of two different embodiments.
Figure 3:
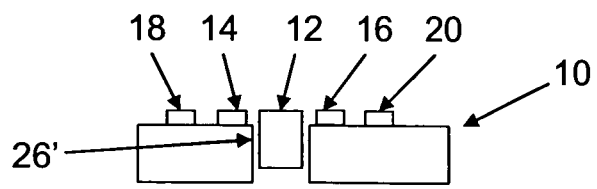

In FIGS. 2 and 3, cross sections along the hatched line in FIG. 1 are seen. The two figures illustrate alternative embodiments where the sensor 12 is either provided in a cavity/indentation 26 (see FIG. 2) or in a through-hole 26' (see FIG. 3) of the PCB 10.

It is noted that the thickness of the electrodes 14, 16, 18 and 20 may be exaggerated, but any position thereof and any thickness thereof may in principle be used. Thicker electrodes also assist in providing a stiff element 10 supporting the sensor 12.

Preferably, the surface of at least the sensor 12 and electrodes 14 and 16 are close to each other and at the same height in order to ensure that a finger swiped there-over will contact all these surfaces.

It is seen that the providing of the sensor 12 in the cavity/through-hole 26/26' provides a number of advantages. One advantage is that the sensor 12 is protected by the PCB 10, which preferably is relatively stiff. This elongate or larger-area sensor 12 may easily break, as it normally has the strength and fragility of glass, and as it may be desired to provide a very thin sensor 12. Actually, it may be desired to back grind the sensor 12 to a thickness of 100 μm, e.g., in order to have the overall thickness as low as possible.

A sensor 12 that thin may require only a very shallow indentation or cavity in the PCB 10, whereas higher or thicker sensors 12 may require a through-hole, depending on the thickness of the PCB 10.

In order to provide the sensor 12 with the stiffness desired, the PCB 10 or PCB may be a multiple-layer, such as four layer, PCB having a flexural strength of 200-1000 N/mm$^2$, such as between 460 and 580 N/mm$^2$, which is that of a 1.6 mm glass fibre/epoxy PCB substrate (IPC-TM-650, test method 2.4.4).

Naturally, this stiffness may be altered by altering the thickness or composition of the PCB 10.

The sensor 12 may be fastened to the PCB 10 in any desired manner. Normally, the sensor 12 will be electrically connected to one or more electrical conductors (not illustrated) of the PCB 10, and this connection may be found to be sufficient. Alternatively or additionally, an adhesive or soldering/welding may be used.

Normally, the PCB 10 will have a number of conducting elements interconnecting the electrodes 14, 16, 18, 20 and 22 with the processor 24 and the sensor 12. These may be provided on the surface of the PCB 10 and/or therein in a multiple-layer structure.

Presently, the PCB 10 may be used in a chip credit card 8, whereby the processor 24 may be used for handling both the data from the sensor 12, comparing the data obtained to data stored in order to determine whether the person engaging the card is allowed to use the card, as well as the normal transactions/communication handled by chip cards. Alternatively, multiple processors (chips, ASICs, FPGAs or a combination thereof) may be used.

Naturally, any type of communication may be used, such as via the electrodes 18, 20, 22, wireless (e.g. radio, RF, RFID, infrared, electromagnetic fields) or via other electrodes.

As mentioned above, the preferred measuring method is the active capacitance measurement method as is used by sensors from Fingerprint Cards AB of Sweden which offers several strong advantages such as an acknowledged high image quality, programmable pixel elements and 256 gray scale values from every single pixel element. The sensors contain small capacitive plates, each with their own electrical circuit embedded in the chip. The sensors use FPC own method HSPA (High Sensitive Pixel Amplifier) which allows each pixel element in the sensor to detect very weak signal, which improves image quality for all types of fingers.

Figure 4:
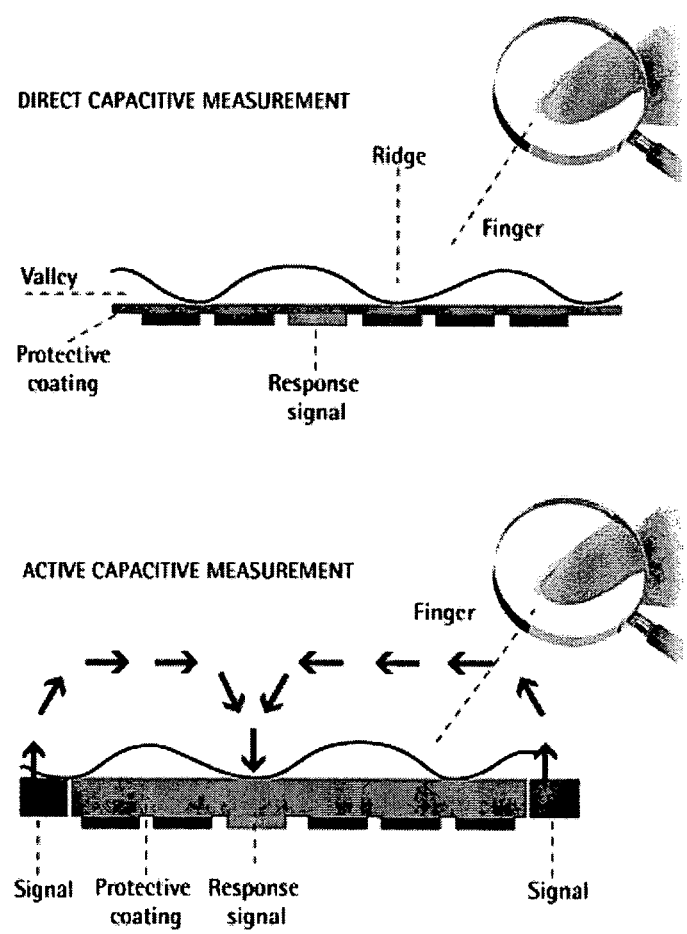
FIG. 4 illustrates two sensing methods.

Direct and active capacitance measurement is illustrated at the top and bottom, respectively, of FIG. 4.

Extremely weak electrical charges, sent via the finger, are created, building a pattern between the finger's ridges or valleys and the sensor's plates. Using these charges the sensor measures the capacitance pattern across the surface.

This product also has a protective coating, 25 to 30 times thicker than other suppliers, that helps the s sensors to withstand well above European Community Standard Class 4 requirement of 15 kV for static electricity (ESD) as well as wear and tear.

Capacitance is the ability to hold an electrical charge. The sensor 12 contains tens of thousands of small capacitive plates, each with their own electrical circuit embedded in the chip. When the finger is placed on the sensor extremely weak electrical charges are created, building a pattern between the finger's ridges or valleys and the sensor's plates. Using these charges the sensor measures the capacitance pattern across the surface. The measured values are digitized by the sensor then sent to the neighboring microprocessor.

The surface of a capacitive sensor is a neat array of plates, able to measure the capacitance between these plates and the fingerprint contour. This can be done directly by applying an electrical charge to the plate;

The bottom method of FIG. 4, which is the preferred method, is called the Active measurement method, sometime referred to as Reflective or Inductive capacitive measurement, and it brings several advantages. Using the programmable logic internal to the capacitive sensor configuration it is possible to read off and adjust the sensor reception to different skin types and conditions. Another important benefit is that the strengthened signal communications between the fingerprint surface and the sensor plates allows for the introduction of strong, protective coating layer, up to 25-30 times thicker than other suppliers, on the sensor surface. This enables the sensor to sustain up to and well above the requirement for 15 kV electrostatic discharge (ESD), as well as wear cycle tests for more than one million touches to the sensor.

The invention being thus described, it will be apparent that the same may be varied in many ways. Such variations are not to be regarded as a departure from the spirit and scope of the invention, and all such modifications as would be recognized by one skilled in the art are intended to be included within the scope of the folling claims.

The invention claimed is:

1. A fingerprint reader comprising:
   a fingerprint sensor adapted to output information relating to a fingerprint of a finger engaging a sensitive surface of the sensor,
   a stiff element comprising an indentation/cavity or through-hole, the sensor being positioned in the indentation/cavity/through hole so that the sensitive surface is exposed to the surroundings, wherein
   the stiff element comprises one or more first electrical conductors and
   the sensor comprises one or more second electrical conductors adapted to carry the output information, each of the one or more second electrical conductors being connected to one or more of the first electrical conductors.

2. A reader according to claim 1, wherein the stiff element further comprises one or more electrically conducting surface parts positioned adjacent to the sensitive surface of the sensor and being adapted to be contacted by a finger also contacting the sensor.

3. A reader according to claim 2, further comprising means for providing a signal to the one or more electrically conductive surface parts where the sensor is adapted to provide the output information on the basis of the said signal provided to the one or more electrically conductive surface parts.

4. A reader according to claim 1, wherein the stiff element comprises a layer of a polymer, a metal, or glass fiber/epoxy defining an overall stiffness of the stiff element and having a thickness of 0.2 mm or more.

5. A reader according to claim 1, further comprising a processing element comprising identity information, the processing element being adapted to:
   receive the output information from the sensor,
   compare the received information to the identity information and
   determine a correspondence between the received information and the identity information.

6. A credit card size card comprising a fingerprint sensor according to claim 1.

7. A card according to claim 6, further comprising a processing element adapted to receive the output information from the sensor, wherein the stiff element further comprises one or more electrically conducting surface parts each connected to the processing element.

8. A method of operating the fingerprint reader according to claim 1, the method comprising:
  a finger engaging a sensitive surface of the sensor,
  the sensor outputting corresponding output information and
  conducting the output information to the first electrical conductor(s).

9. A method of operating a fingerprint reader that comprises
  a fingerprint sensor adapted to output information relating to a fingerprint of a finger engaging a sensitive surface of the sensor,
  a stiff element comprising an indentation/cavity or through-hole, the sensor being positioned in the indentation/cavity/through hole so that the sensitive surface is exposed to the surroundings, wherein
  the stiff element comprises one or more first electrical, conductors and
  the sensor comprises one or more second electrical conductors adapted to carry the output information, each of the one or more second electrical conductors being connected to one or more of the first electrical conductors, the method comprising:
  a finger engaging a sensitive surface of the sensor,
  the sensor outputting corresponding output information and
  conducting the output information to the first electrical conductor(s), wherein said engaging step comprises the finger additionally contacting one or more electrically conducting surface parts of the stiff element positioned adjacent to the sensitive surface of the sensor.

10. A method according to claim 9, wherein the outputting step comprises providing a signal to the electrically conductive surface parts and providing the output information on the basis of the signal provided to the surface part(s).

11. A method according to claim 8, further comprising the steps of:
  comparing the output information to predetermined identity information and
  determining a correspondence between the received information and the identity information.

12. A fingerprint reader for insertion in a bendable credit card, said, fingerprint reader relatively stiffer then said credit card, said fingerprint reader comprising,
  a fingerprint sensor having a sensitive surface and adapted to output information relating to a fingerprint of a finger engaging said sensitive surface,
  a stiff printed circuit board (PCB) comprising an indentation/cavity that extends partially or entirely through the PCB, said sensor positioned in the indentation/cavity and fastened to said PCB so that the sensitive surface is exposed to the surroundings,
  wherein said stiff PCB and said sensor each include electrical, conductors connected to each other to enable the output information to be carried from said sensor,
  wherein said stiff PCB includes electrically conducting surfaces positioned. adjacent said sensitive surface of said sensor and sized to enable finger contact to contact both the sensitive surface and said electrically conducting surfaces, and
  wherein the PCB has a thickness of 0.2 mm or more.

13. The fingerprint reader of claim 12, wherein the PCB has a stiffness of 100 N/mm$^2$ or more.

* * * * *

UNITED STATES PATENT AND TRADEMARK OFFICE
CERTIFICATE OF CORRECTION

| | | |
|---|---|---|
| PATENT NO. | : 8,933,781 B2 | |
| APPLICATION NO. | : 12/736914 | |
| DATED | : January 13, 2015 | |
| INVENTOR(S) | : Alexandre Desnoyers | |

It is certified that error appears in the above-identified patent and that said Letters Patent is hereby corrected as shown below:

In the Claims

Column 8, line 23, delete the "."; and

Column 8, line 26, delete the "." and after "adjacent" insert --to--.

Signed and Sealed this
Twenty-eighth Day of April, 2015

Michelle K. Lee
*Director of the United States Patent and Trademark Office*